Figure 1:
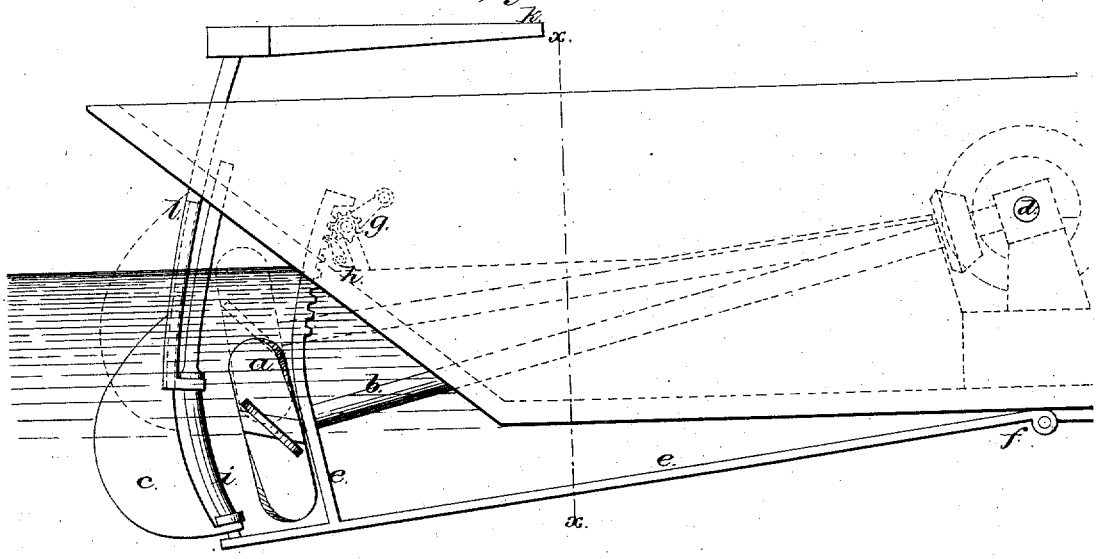

J. M. DODGE.

Screw Propellers.

No. 6,031. Reissued Aug. 25, 1874.

*Attest:*
Nathan Lewis
Wm Kemble Hall.

*Inventor:*
James Wakes Dodge.

THE GRAPHIC CO. PHOTO-LITH. 39 & 41 PARK PLACE, N.Y.

UNITED STATES PATENT OFFICE.

JAMES MAPES DODGE, OF NEWARK, NEW JERSEY.

IMPROVEMENT IN SCREW-PROPELLERS.

Specification forming part of Letters Patent No. 130,110, dated August 6, 1872; reissue No. 6,031, dated August 25, 1874; application filed August 14, 1874.

*To all whom it may concern:*

Be it known that I, JAMES MAPES DODGE, of Newark, in the county of Essex and State of New Jersey, have invented certain new and useful Improvements in Screw-Propulsion, of which the following is a specification:

The said invention permits the variation of the immersion of a screw-propeller, and its operation at such angles to the vessel as may be deemed desirable. It consists in hanging the outer end of the shaft in a frame that may be raised or lowered by appropriate machinery, and in combining therewith the shaft with an open trunk through which the inner end of the vibrating shaft passes to the clutch or gearing connected with the main shaft of the engine. By this means the immersion of the screw may be increased in deep water, when required either by the lightness of the draft or the pitching of the vessel. In shoal-water navigation the opening for the passage of the shaft through the trunk to the interior of the vessel may be placed above the water-line, so that no stuffing-box will be required. In sea-going vessels, the inner end of the trunk will necessarily require to be fitted with a stuffing-box, which, from its position near the center of motion, owing to the length of the trunk, will require to provide for but a small radial motion. If there were no trunk, there would be provision needed at the stern-post for the entire vertical range of the screw. As the removal of a portion of the keel, to permit the dropping of the screw, leaves the outer stern-post and the rudder without support at their lower ends, the frame may be extended beyond the screw to secure the foot of the rudder or post. By jointing this frame to the keel, the striking of the vessel on the bottom will cause the screw or the screw and rudder to be lifted.

To enable others skilled in the art to which it appertains to make and use my invention, I will proceed to describe its construction and operation with reference to the drawing.

Figure 2:
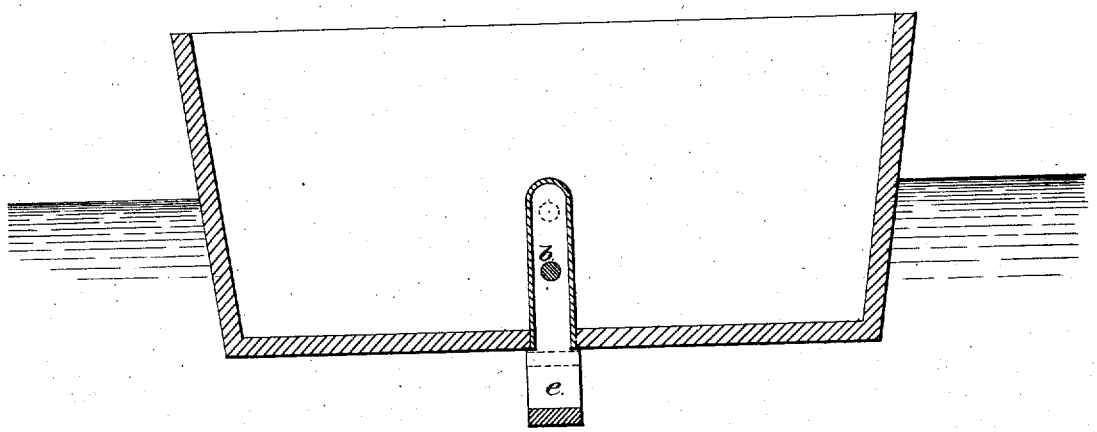

Fig. 1 is a sectional elevation, illustrating my invention as applied to a flat-bottomed canal-boat. Fig. 2 is a cross-section of the same at the line *x*.

The dotted lines indicate the position of the propeller *a*, shaft *b*, and the rudder *c*, when raised. The shaft *b* is supported at its inner end by appropriate means for the transmission of the power at varying angles. When the center of vibration of the shaft lies in the center-line of the bevel-gearing, as shown in the drawing, the angle of the shaft will have no influence upon the manner in which it is driven. The frame *e e* that supports the outer end of the propeller-shaft is hinged to the boat at *f* and passes up through the stern, where it is furnished with a rack that gears into a pinion, *g*, by which it may be raised, and also a pawl, *h*, by which it may be supported at any point. The joint *f* of the frame should be placed in such a position that the frame will be easily forced up when the boat strikes the bottom, and the more nearly it coincides vertically with the center of vibration of the shaft, the less will be the longitudinal movement of the shaft through the outer bearing, and the less room need be provided for clearance. By hinging the vertical and horizontal portions of the frame, they may be made to effect the same end, approximately, by working together after the manner of a parallel motion. The opening of the trunk need not weaken the vessel by passing through the bottom. The rudder *c* is carried by the outer stern-post *i*, which forms a portion of the vibrating frame *e*, and, therefore, accompanies the vertical movement of the frame and screw. It is operated by the tiller *k* and the rudder-head *l*, which is fitted to the rudder in a way that will permit the rudder-blade to slide within or over the head, and at the same time receive the necessary rotary motion from the tiller.

I claim as my invention—

The combination of a vertically-adjustable frame, a propeller having a vibrating shaft, and an open trunk, substantially as described.

JAMES MAPES DODGE.

Witnesses:
WM. KEMBLE HALL,
CHARLES THIES.